(12) United States Patent
Zeng

(10) Patent No.: US 10,855,820 B2
(45) Date of Patent: *Dec. 1, 2020

(54) EJECTION ASSEMBLY AND ELECTRONIC DEVICE

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,575

(22) Filed: Sep. 5, 2019

(65) Prior Publication Data

US 2019/0394313 A1 Dec. 26, 2019

Related U.S. Application Data

(63) Continuation of application No. 16/215,447, filed on Dec. 10, 2018, now Pat. No. 10,432,763, which is a (Continued)

(30) Foreign Application Priority Data

Oct. 25, 2017 (CN) ..................... 2017 2 1395385 U
Feb. 9, 2018 (CN) ..................... 2018 2 0235844 U

(51) Int. Cl.
*H04M 1/02* (2006.01)

(52) U.S. Cl.
CPC ....... *H04M 1/0254* (2013.01); *H04M 1/0237* (2013.01); *H04M 1/0264* (2013.01); *H04M 1/0283* (2013.01)

(58) Field of Classification Search
CPC ............. H04M 1/0237; H04M 1/0254; H04M 1/0264; H04M 1/0283; G06F 1/1624; G06F 1/1675
See application file for complete search history.

(56) References Cited

U.S. PATENT DOCUMENTS

2003/0078082 A1 4/2003 Su
2009/0203398 A1 8/2009 Griffin
(Continued)

FOREIGN PATENT DOCUMENTS

CN 200987185 Y 12/2007
CN 101907509 A 12/2010
(Continued)

OTHER PUBLICATIONS

International search report for Application No. PCT/CN2018/108834, dated Jan. 2, 2019 (9 pages).
(Continued)

*Primary Examiner* — Said M Elnoubi
(74) *Attorney, Agent, or Firm* — Ladas & Parry LLP

(57) ABSTRACT

An electronic device includes a screen assembly, a back cover, a middle frame, and an ejection assembly. A length of the middle frame in a first direction is less than those of the screen assembly and the back cover in the first direction, and a mounting portion is formed by the screen assembly, the middle frame, and the back cover. The ejection assembly includes at least one driving mechanism, a first decorative member, a second decorative member, and at least one lifting mechanism. Driven by the at least one driving mechanism, the at least one lifting mechanism is capable of driving the first decorative member and the second decorative member to move away from each other, such that the first
(Continued)

decorative member is substantially flush with the screen assembly, and the second decorative member is substantially flush with the back cover.

20 Claims, 8 Drawing Sheets

Related U.S. Application Data continuation of application No. PCT/CN2018/108834, filed on Sep. 29, 2018.

(56) References Cited

U.S. PATENT DOCUMENTS

| | | | |
|---|---|---|---|
| 2009/0212675 A1 | 8/2009 | Zhang et al. | |
| 2009/0233660 A1* | 9/2009 | Demuynck | H04M 1/0247 455/575.4 |
| 2011/0157033 A1 | 6/2011 | Rema Shanmugam et al. | |
| 2011/0249384 A1 | 10/2011 | Warren et al. | |
| 2012/0274570 A1 | 11/2012 | Kim | |

FOREIGN PATENT DOCUMENTS

| | | |
|---|---|---|
| CN | 105100312 A | 11/2015 |
| CN | 105897972 A | 8/2016 |
| CN | 106657456 A | 5/2017 |
| CN | 106713549 A | 5/2017 |
| EP | 1558007 A1 | 7/2005 |
| EP | 3163845 A1 | 5/2017 |
| EP | 3255867 A1 | 12/2017 |
| WO | 2014182596 A1 | 11/2014 |

OTHER PUBLICATIONS

International search report for Application No. PCT/CN2018/108832, dated Dec. 29, 2018 (9 pages).
European search report for Application No. EP18210850.6, dated Feb. 2, 2019 (7 pages).
European search report for Application No. EP18210852.2, dated May 31, 2019 (8 pages).
English translation of the International search report for Application No. PCT/CN2018/108834, dated Jan. 2, 2019 (2 pages).
English translation of the International search report for Application No. PCT/CN2018/108832, dated Dec. 29, 2018 (2 pages).
Non Final Action and Written Opinion for related U.S. Appl. No. 16/214,429, dated May 17, 2019 (15 pages).
European Examination Report and Written Opinion for related European application No. 18210852.2, dated May 28, 2020 (5 pages).
Indian First Examination Report and Written Opinion for related Indian application No. 201814046182, dated Aug. 17, 2020 (6 pages).

* cited by examiner

EJECTION ASSEMBLY AND ELECTRONIC DEVICE

CROSS REFERENCE TO RELATED APPLICATIONS

This is a continuation application of U.S. patent application Ser. No. 16/215,447, filed on Dec. 10, 2018, which is a continuation application of PCT/CN2018/108834, filed on Sep. 29, 2018, the contents of which are herein incorporated by reference in their entireties.

TECHNICAL FIELD

The described embodiments relate to electronic devices, and in particular, to an ejection assembly and an electronic device comprising the ejection assembly.

BACKGROUND

Maximizing a screen ratio of a mobile phone is the main development direction of the mobile phone in the future. In order to improve the screen ratio of the mobile phone, in the related art, multiple methods are used. The methods for improving the screen ratio include: using an independent pop-up camera, bone conduction technology, a front camera arranged at the bottom, and the like. However, when using the independent pop-up camera, a hole need to be defined in the housing of the mobile phone, and the camera partially protrudes out of the housing, which affects the overall appearance of the mobile phone. When using the bone conduction technology, it is possible to avoid defining the hole in the housing, however, the sound quality is poor. The front camera arranged at the bottom may also be used, however, the user experience is poor.

SUMMARY

In one aspect, an electronic device may be provided. The electronic device may include a screen assembly, a back cover opposite to the screen assembly, a middle frame sandwiched between the screen assembly and the back cover, an ejection assembly. A length of the middle frame in a first direction is less than a length of the screen assembly in the first direction, and less than a length of the back cover in the first direction, such that a mounting portion may be formed by the screen assembly, the middle frame, and the back cover. The ejection assembly may be movably disposed in the mounting portion. The ejection assembly may include at least one driving mechanism, a first decorative member, a second decorative member, and at least one lifting mechanism. The second decorative member may be disposed opposite to and spaced apart from the first decorative member. The first decorative member and the second decorative member may be movable toward each other or away from each other. The at least one lifting mechanism may be disposed between the first decorative member and the second decorative member. Each of the at least one lifting mechanism may be connected to the corresponding driving mechanism. Driven by the at least one driving mechanism, the at least one lifting mechanism may be capable of driving the first decorative member and the second decorative member to move away from each other, such that the first decorative member is substantially flush with the screen assembly, and the second decorative member is substantially flush with the back cover.

In another aspect, an electronic device may be provided. The electronic device may include a screen assembly, a back cover opposite to the screen assembly, a middle frame sandwiched between the screen assembly and the back cover, and an ejection assembly. The middle frame includes a pair of spaced and parallel external walls engaged with the screen assembly and the back cover; each of the external walls has a top lower than tops of the screen assembly and the back cover, and a mounting portion may be defined by the tops of the screen assembly, the middle frame, and the back cover. The ejection assembly may be movably disposed in the mounting portion, and has a first position at which the ejection assembly partially extends out of the mounting portion and a second position at which the ejection assembly is received in the mounting portion. The ejection assembly may include a first decorative member, a second decorative member opposite to and spaced apart from the first decorative member, at least one lifting mechanism, and at least one driving mechanism. The first decorative member and the second decorative member may be movable toward each other or away from each other. The at least one lifting mechanism may be disposed between the first decorative member and the second decorative member, and configured to drive the first decorative member and the second decorative member to move away from each other when the ejection assembly is at the first position, such that the first decorative member may be substantially flush with the screen assembly, and the second decorative member may be substantially flush with the back cover. The at least one driving mechanism may be connected to each of the at least one lifting mechanism.

In a further aspect, an ejection assembly for an electronic device may be provided. The electronic device may include a back cover, a screen assembly covering the back cover, and a middle frame sandwiched between the screen assembly and the back cover. A length of the middle frame in a first direction is less than a length of the screen assembly in the first direction, and less than a length of the back cover in the first direction, such that a mounting portion is formed by the screen assembly, the middle frame, and the back cover. The ejection assembly may be movably disposed in the mounting portion and has a first position at which the ejection assembly partially extends out of the mounting portion and a second position at which the ejection assembly is received in the mounting portion. The ejection assembly may include at least one driving mechanism, a first decorative member, a second decorative member, and at least one lifting mechanism. The second decorative member may be disposed opposite to and spaced apart from the first decorative member. The first decorative member and the second decorative member may be movable toward each other or away from each other. The at least one lifting mechanism may be disposed between the first decorative member and the second decorative member. Each of the at least one lifting mechanism may be connected to the corresponding driving mechanism. Driven by the at least one driving mechanism, the at least one lifting mechanism may be capable of driving the first decorative member and the second decorative member to move away from each other when the ejection assembly is at the first position, such that the first decorative member is substantially flush with the screen assembly, and the second decorative member is substantially flush with the back cover.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description are merely some embodiments of the present disclosure, for those skilled in the art, other drawings can be obtained based on these drawings without creative efforts.

DETAILED DESCRIPTION

Figure 1:
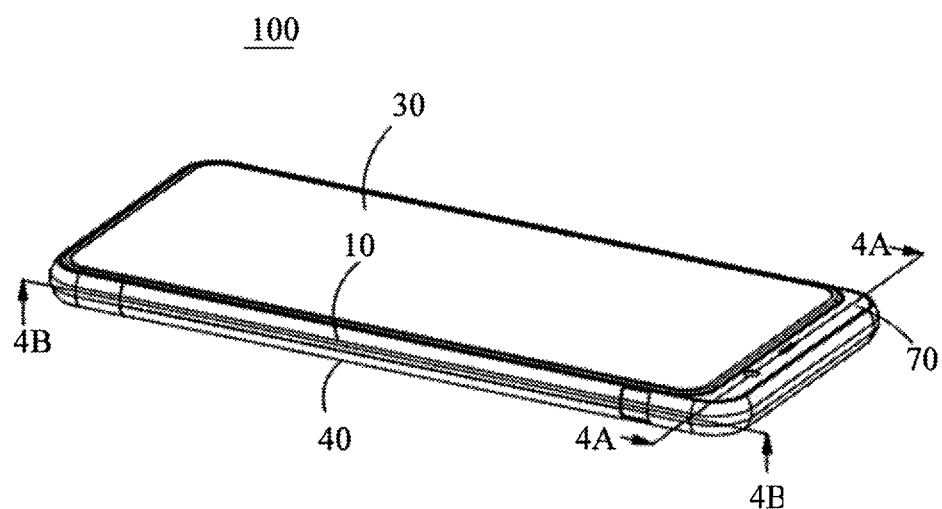
FIG. 1 is a schematic structural view of an electronic device according to some embodiments of the present disclosure.

The technical solutions in the embodiments of the present disclosure will be clearly and completely described in detail below with reference to the accompanying drawings in the embodiments of the present disclosure. Apparently, the embodiments described herein are only some exemplary embodiments, not all the embodiments. Based on the embodiments described in the present disclosure, one skilled in the art may acquire all other embodiments without any creative efforts. All these shall be covered within the protection scope of the present disclosure.

Terms such as "first", "second", "third", and the like are used herein for purposes of description, and are not intended to indicate or imply relative importance or significance or to imply the number of indicated technical features. Thus, features defined with "first", "second" and "third" may explicitly or implicitly include at least one of the features. In the description of the present disclosure, "a plurality of" means two or more, such as two, three, and the like, unless specified otherwise. All directional indications (such as up, down, left, right, front, back, and the like) in some embodiments of the present disclosure are only used to explain the relative positional relationship between components in a certain state (as shown in the figures), the movement situation, and the like; if the specific state changes, the directional indication also changes accordingly. Moreover, the terms "comprise", "include" or any other variations thereof are meant to cover non-exclusive including. For example, processes, methods, systems, articles or devices comprising a series of steps or elements do not only include those steps or elements, but also include other steps or elements that are not explicitly listed or also include the inherent steps or elements of the processes, methods, systems, articles or devices.

The term "embodiment" in the present disclosure indicates the specific features, structures, or characteristics may be included in at least one embodiment of the present disclosure. The terms appearing in different in various positions of the specification may not indicate the same embodiment, and may not indicate that the embodiment is independent from, alternative, or exclusive from other embodiments. Those skilled in the art may explicitly or implicitly understand that, the embodiment of the present disclosure may be combined with other embodiments.

In the description of the embodiments of the present disclosure, it should be understood that, the orientation or positional relationship indicated by the term "thickness" and the like is based on the orientation or positional relationship shown in the drawings, and is merely for convenience of description and for simplifying description, rather than implying or indicating that the device or the component must have a particular orientation or constructed and operated in a particular orientation, and thus these terms cannot to be construed as limiting the present disclosure.

In one aspect, an electronic device may be provided. The electronic device may include a screen assembly, a back cover opposite to the screen assembly, a middle frame sandwiched between the screen assembly and the back cover, an ejection assembly. A length of the middle frame in a first direction is less than a length of the screen assembly in the first direction, and less than a length of the back cover in the first direction, such that a mounting portion may be formed by the screen assembly, the middle frame, and the back cover. The ejection assembly may be movably disposed in the mounting portion. The ejection assembly may include at least one driving mechanism, a first decorative member, a second decorative member, and at least one lifting mechanism. The second decorative member may be disposed opposite to and spaced apart from the first decorative member. The first decorative member and the second decorative member may be movable toward each other or away from each other. The at least one lifting mechanism may be disposed between the first decorative member and the second decorative member. Each of the at least one lifting mechanism may be connected to the corresponding driving mechanism. Driven by the at least one driving mechanism, the at least one lifting mechanism may be capable of driving the first decorative member and the second decorative member to move away from each other, such that the first decorative member is substantially flush with the screen assembly, and the second decorative member is substantially flush with the back cover.

In some embodiments, each of the at least one lifting mechanism may include a first bevel gear, a second bevel gear, a first lead screw, and a push rod. The first bevel gear may have an axis substantially parallel to the first direction, and may be coupled to one of the at least one driving mechanism. The second bevel gear, may have an axis substantially parallel to a second direction, and may be engaged with the first bevel gear. The second direction may be perpendicular to the first direction. The first lead screw may be disposed coaxially with the second bevel gear, and define a first groove. The push rod may be adjacent to the first lead screw and extending in a direction substantially parallel to the second direction. One end of the push rod may be inserted in the first groove, and the other end of the push rod may cooperate with the first decorative member and the second decorative member, such that the push rod pushes the first decorative member and the second decorative member to move away from each other. In some embodiments, the push rod may include: a rod body, a first inserting portion, and a pushing portion. The rod body may be disposed at a side wall of the rod body that faces towards the first lead screw, the first inserting portion may be inserted into the first groove. The pushing portion may be disposed at one end of the rod body along the second direction, the pushing portion may cooperate with the first decorative member and the second decorative member to push the first decorative member and the second decorative member to move away from each other.

In some embodiments, the pushing portion may include a pair of first inclined surfaces opposite to each other. The first decorative member may include a second inclined surface, and the second decorative member may include a third inclined surface. The second inclined surface may cooperate with one of the pair of first inclined surfaces, while the third inclined surface may cooperate with the other of the pair of first inclined surfaces.

In some embodiments, each of the at least one driving mechanism may include a driving member, a fixing member, and a transmission shaft. The driving member may be disposed on the middle frame via the fixing member, and the transmission shaft may be adjacent to an output shaft of the driving member along the first direction. The transmission shaft may pass through the middle frame and be further connected to the first bevel gear.

In some embodiments, the ejection assembly may further include a bracket. The bracket may further include an outer frame and a supporting body. The outer frame may extend around a periphery of the supporting body, the lifting mechanism may be disposed on the supporting body.

In some embodiments, a mounting post is disposed at one end of the first lead screw that is away from the second bevel gear, and the supporting body defines a mounting hole; the first lead screw is mounted in the mounting hole via the mounting post.

In some embodiments, the supporting body may have a first surface and a second surface opposite to the first surface. A first receiving portion, a second receiving portion, and a third receiving portion may be sequentially arranged on the first surface of the supporting body and correspond to each of the at least one lifting mechanism. The first receiving portion may extend along the first direction. The second receiving portion may be communicated with the first receiving portion, and extend along the second direction. The third receiving portion may be disposed at one side of the second receiving portion that is away from the first receiving portion, communicated with the second receiving portion, and extend through two opposite side faces of the supporting body. The first bevel gear may be disposed in the first receiving portion, and the second bevel gear and the first lead screw may be disposed at one side of the second receiving portion. A portion of the push rod may be disposed at the other side of the second receiving portion, and the other portion of the push rod may be disposed in the third receiving portion. The push rod may extend out of the third receiving portion, and cooperate with the first decorative member and the second decorative member.

In some embodiments, the supporting body may further include a guiding block, and the guiding block may be disposed on the second receiving portion. The push rod may define a guiding groove in the second direction, and the guiding block may be inserted into the guiding groove.

In some embodiments, the ejection assembly may further include a protective cover; the protective cover is disposed on the first surface, located between the supporting body and the second decorative member, and covers the first receiving portion and the second receiving portion.

In some embodiments, the supporting body has a first surface and a second surface opposite to the first surface. A fourth receiving portion may be arranged on the second surface of the supporting body. At least one functional device may be disposed at one side of the first decorative member that is close to the supporting body. When the first decorative member is disposed on the supporting body, the at least one functional device may be disposed in the fourth receiving portion.

In some embodiments, one of the at least one functional device may be provided with a first magnetic member, and the ejection assembly may further include a second magnetic member. The second magnetic member may be disposed on the second decorative member. A reserved portion may be arranged on the supporting body at a position corresponding to the second magnetic member. When the first decorative member and the second decorative member are driven to move away from each other and the push rod does not push against the first decorative member and the second decorative member, the first magnetic member and the second magnetic member may attract each other, such that the first decorative member and the second decorative member may move toward each other, and the first decorative member and the second decorative member may be reset.

In some embodiments, the ejection assembly may further include an ejecting mechanism and a second inserting portion. The ejecting mechanism may further include at least one second lead screw. Each of the at least one second lead screw may be disposed between the driving mechanism and the first bevel gear. Each of the at least one second lead screw rod may define a second groove. The second inserting portion may be disposed corresponding to the at least one second lead screw. The second inserting portion is inserted into the second groove.

In some embodiments, the first groove may include a slow-moving section and a first fast-moving section, and the second groove may include a second fast-moving section and an idle section. When the first inserting portion is located in the slow-moving section, the second inserting portion may be located in the second fast-moving section. When the first inserting portion is located in the first fast-moving section, the second inserting portion may be located in the idle section.

In some embodiments, the ejection assembly may further include a bracket, and the bracket comprises an outer frame and a supporting body; the outer frame extends around a periphery of the supporting body. Each free end of the outer frame may protrude outwardly to form a guiding portion, and the guiding portion may be disposed adjacent to the second inserting portion. The guiding portion may be inserted into one side of the middle frame, such that a smooth outer surface may be formed by the guiding portion and the middle frame.

In another aspect, an electronic device may be provided. The electronic device may include a screen assembly, a back cover opposite to the screen assembly, a middle frame sandwiched between the screen assembly and the back cover, and an ejection assembly. The middle frame includes a pair of spaced and parallel external walls engaged with the screen assembly and the back cover; each of the external walls has a top lower than tops of the screen assembly and the back cover, and a mounting portion may be defined by the tops of the screen assembly, the middle frame, and the back cover. The ejection assembly may be movably disposed in the mounting portion, and has a first position at which the ejection assembly partially extends out of the mounting portion and a second position at which the ejection assembly is received in the mounting portion. The ejection assembly may include a first decorative member, a second decorative member opposite to and spaced apart from the first decorative member, at least one lifting mechanism, and at least one driving mechanism. The first decorative member and the second decorative member may be movable toward each other or away from each other. The at least one lifting mechanism may be disposed between the first decorative member and the second decorative member, and configured to drive the first decorative member and the second decorative member to move away from each other when the ejection assembly is at the first position, such that the first decorative member may be substantially flush with the screen assembly, and the second decorative member may be substantially flush with the back cover. The at least one driving mechanism may be connected to each of the at least one lifting mechanism.

In a further aspect, an ejection assembly for an electronic device may be provided. The electronic device may include a back cover, a screen assembly covering the back cover, and a middle frame sandwiched between the screen assembly and the back cover. A length of the middle frame in a first direction is less than a length of the screen assembly in the first direction, and less than a length of the back cover in the first direction, such that a mounting portion is formed by the screen assembly, the middle frame, and the back cover. The ejection assembly may be movably disposed in the mounting portion and has a first position at which the ejection assembly partially extends out of the mounting portion and a second position at which the ejection assembly is received in the mounting portion. The ejection assembly may include at least one driving mechanism, a first decorative member, a second decorative member, and at least one lifting mechanism. The second decorative member may be disposed opposite to and spaced apart from the first decorative member. The first decorative member and the second decorative member may be movable toward each other or away from each other. The at least one lifting mechanism may be disposed between the first decorative member and the second decorative member. Each of the at least one lifting mechanism may be connected to the corresponding driving mechanism. Driven by the at least one driving mechanism, the at least one lifting mechanism may be capable of driving the first decorative member and the second decorative member to move away from each other when the ejection assembly is at the first position, such that the first decorative member is substantially flush with the screen assembly, and the second decorative member is substantially flush with the back cover.

Figure 2:
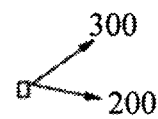
FIG. 2 is a partially exploded view of the electronic device shown in FIG. 1 along one direction according to some embodiments of the present disclosure.
Figure 2:
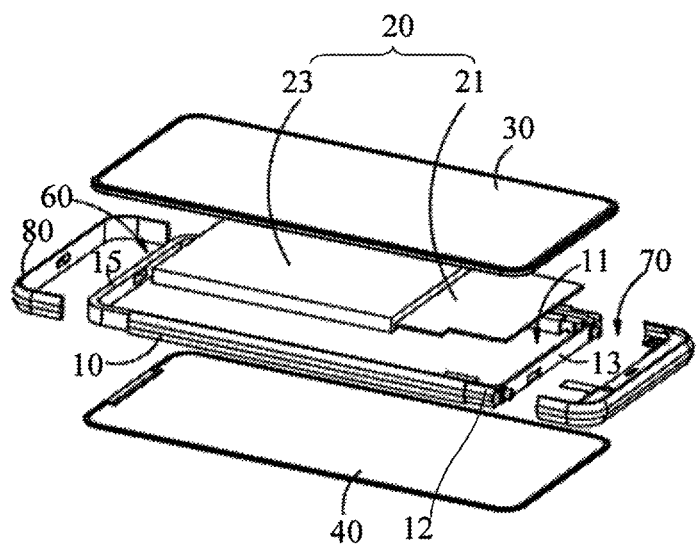

Referring to FIG. 1, an electronic device 100 according to some embodiments of the present disclosure may be depicted. In some embodiments, the electronic device 100 may be a mobile phone. It can be understood that, in other embodiments, the electronic device 100 may not be limited to a mobile phone; instead, the electronic device 100 may also be a tablet, a laptop, a desktop, a television, and the like. Referring to FIG. 2 together, the electronic device 100 may include a middle frame 10, a control assembly 20, a screen assembly 30, a back cover 40, an ejection assembly 70, and a bottom decorative member 80. The screen assembly 3Q may cover the back cover 40. The middle frame 10 may be substantially in shape of a closed frame, and sandwiched between the screen assembly 30 and the rear cover 40, such that the middle frame 10, the screen assembly 30, and the rear cover 40 cooperatively define a receiving space 11. The middle frame 10 may have a first end 13 and a second end 15 opposite to the first end 13. The control assembly 20 may be mounted in the receiving space 11. More specifically, the control assembly 20 may include a main board 21 and a battery 23. In one embodiment, the main board 21 may be received in the receiving space 11, and close to the first end 13. The battery 23 may also be disposed in the receiving space 11, adjacent to the main board 21, and further close to the second end 15. The screen assembly 30 and the rear cover 40 may respectively cover on two opposite sides of the middle frame 10. Thus, the main board 21 and the battery 23 may be arranged between the screen assembly 30 and the rear cover 40. For convenience of description, a first direction 200 and a second direction 300 are defined in the present disclosure. The first direction 200 refers to a direction starting from the second end 15 of the middle frame 10 to the first end 13 of the middle frame 10. The second direction 300 refers to a direction that is located in a same plane as the first direction 200, and the second direction 300 is perpendicular to the first direction 200. In this embodiment, the first direction 200 may be a lengthwise direction of the electronic device 100, and the second direction 300 may be a width direction of the electronic device 100. Of course, in other embodiments, it is also possible that the first direction 200 may be a width direction of the electronic device 100, and the second direction 300 may be a lengthwise direction of the electronic device 100. Besides, the plane in which the first direction 200 and the second direction 300 is located may be substantially parallel to the plane in which the screen assembly 30 is located.

Figure 3:
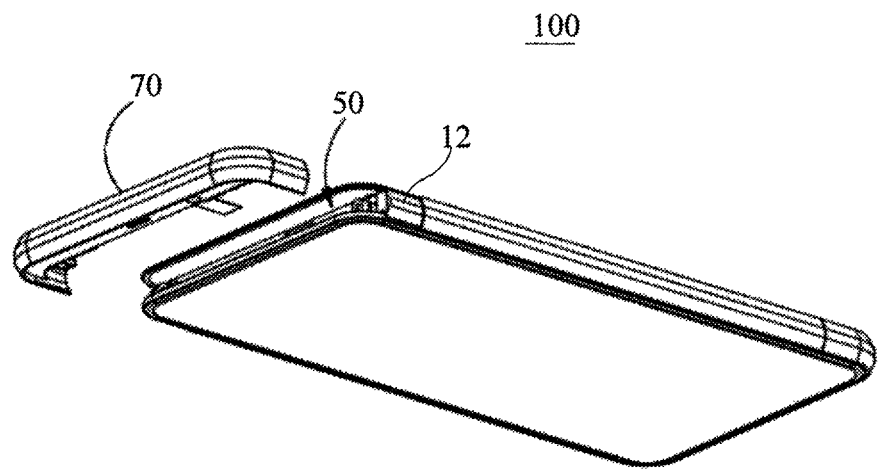
FIG. 3 is a partially exploded view of the electronic device shown in FIG. 1 along another direction according to some embodiments of the present disclosure.

A size of the screen assembly 30 in the first direction 200 may be substantially equal to that of the back cover 40. A size of the middle frame 10 (that is, a length of the middle frame 10) in the first direction 200 may be less than a length of the screen assembly 30 in the first direction 200, and less than a length of the back cover 40 in the first direction 200. Referring to FIG. 3 together, more specifically, the middle frame 10 may include a pair of spaced and parallel external walls 12 engaged with the screen assembly 30 and the back cover 40. Each of the external walls 12 may have a top lower than tops of the screen assembly 30 and the back cover 40. The top of the screen assembly 30, the top of the middle frame 10, and the top of the rear cover 40 may cooperatively define a first mounting portion 50. The ejection assembly 70 may be movably disposed in the first mounting portion 50, such that the ejection assembly 70 is capable of extending out of the first mounting portion 50 or retracting into the first mounting portion 50. Herein, the top may refer to an edge of the corresponding component (such as the screen assembly 30, the middle frame 10, the rear cover 40, and the like) that is adjacent to the ejection assembly 70. For example, as for the middle frame 10, the top may be an edge disposed at the first end 13. The screen assembly 30, the second end 15 of the middle frame 10, and the rear cover 40 may cooperatively define a second mounting portion 60. The ejection assembly 70 may be mounted in the first mounting portion 50. The bottom decorative member 80 may be mounted in the second mounting portion 60.

Figure 4A:
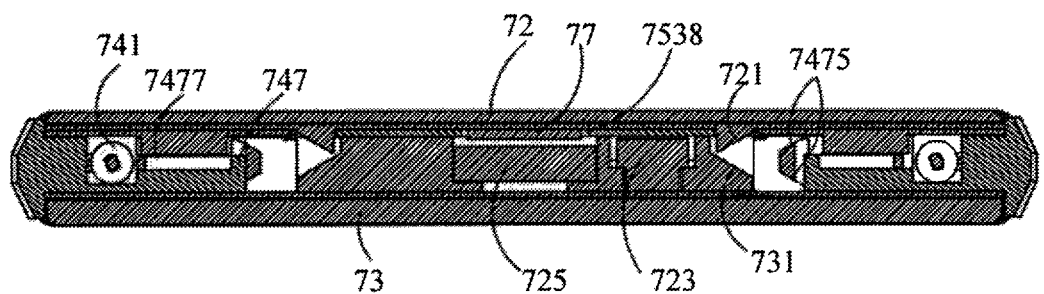
FIG. 4A is a sectional view of the electronic device shown in FIG. 1 taken along line 4A-4A according to some embodiments of the present embodiment; wherein the electronic device is in a first state.
Figure 4B:
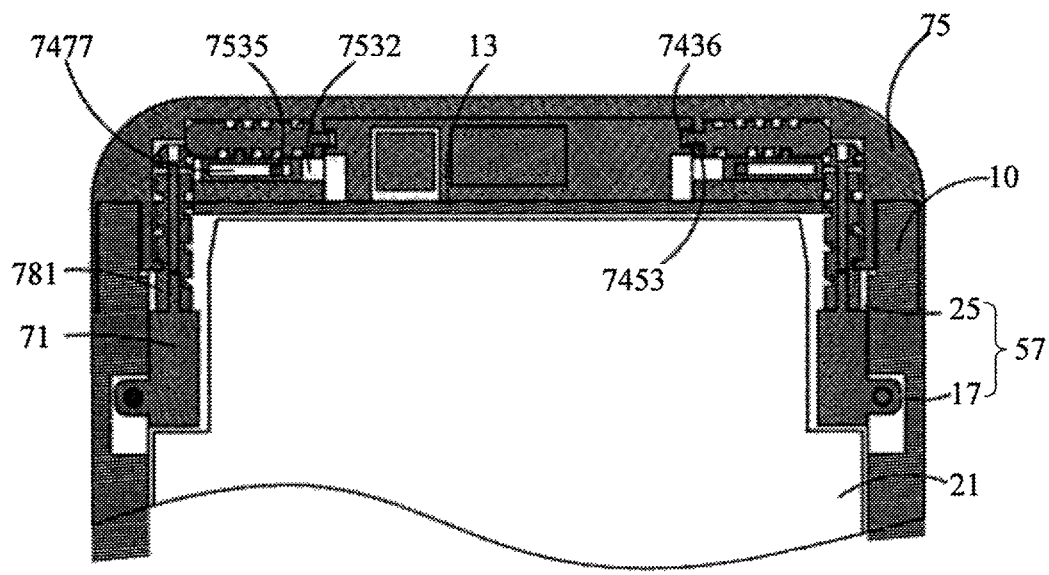
FIG. 4B is a sectional view of the electronic device shown in FIG. 1 taken along 4B-4B direction according to some embodiments of the present embodiment; wherein the electronic device is in the first state.

Referring to FIG. 4A and FIG. 4B together, at least one reserved space 57 may be defined between two sub-frames of the middle frame 10 and one side of the main board 21 that is close to the first end 13. In some embodiments, two reserved space 57 may be defined. More specifically, a first reserved portion 17 may be formed in each sub-frame of the middle frame 10, and a second reserved portion 25 may be formed in each side of the main board 21 that is close to the first end 13 respectively. The first reserved portion 17 and the corresponding second reserved portion 25 may communicate with each other, such that the reserved space 57 is defined by the first reserved portion 17 and the corresponding second reserved portion 25.

Figure 5:
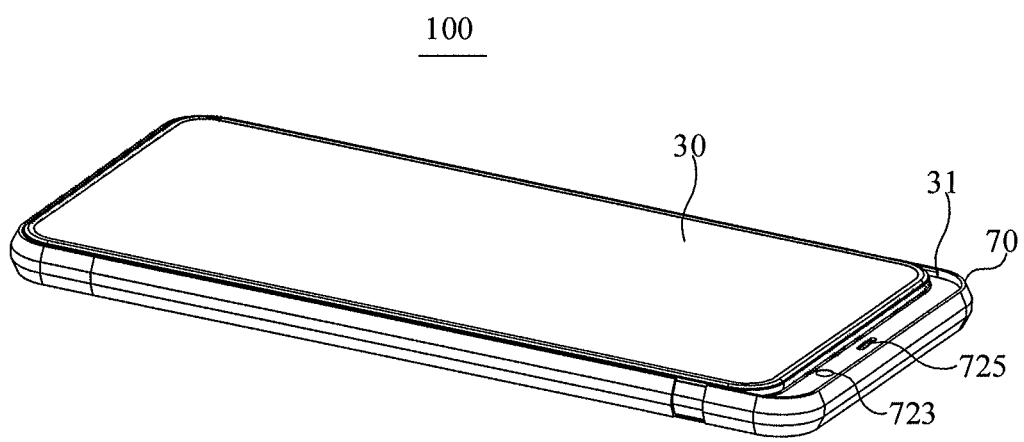
FIG. 5 is a schematic view showing a front side of the electronic device shown in FIG. 1 according to some embodiments of the present embodiment; wherein a first decorative member and a second decorative member has not been lifted.
Figure 6:
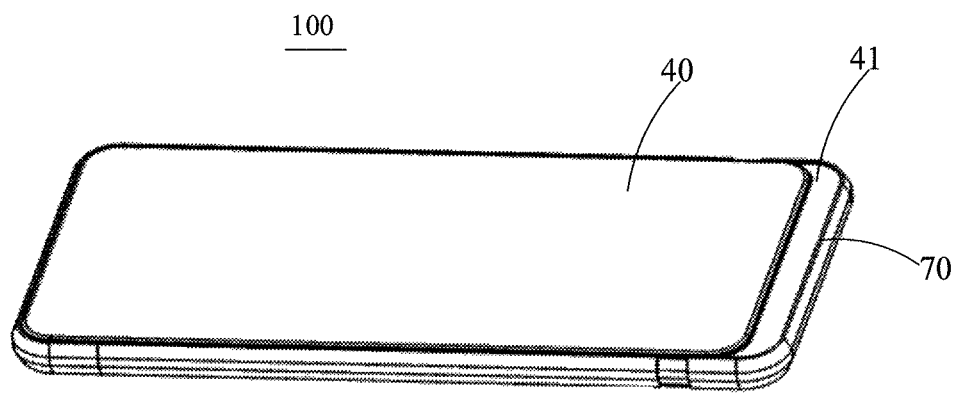
FIG. 6 is a schematic view showing a rear side of the electronic device shown in FIG. 1 according to some embodiments of the present embodiment; wherein the first decorative member and the second decorative member has not been lifted.

Referring to FIG. 5 and FIG. 6 together, the electronic device may further include at least one functional device mounted on the ejection assembly 70 (in the embodiment, the at least one functional devices may include, for example, a camera 723 and a receiver 725). When the ejection assembly 70 extends out of the first mounting portion 50, at least one functional device can be seen, such that a user may use the at least one functional device conveniently. When the ejection assembly 70 retracts into the first mounting portion 50, at least one functional device may be received in the first mounting portion 50, such that the at least one functional device may be protected by the screen assembly 30 and the back cover 40, and cannot be seen from the outside of the electronic device 100. A size of the first mounting portion 50 in a normal direction of the plane formed by the first direction 200 and the second direction 300 may be less than a maximum distance from an outer surface of the screen assembly 30 to an outer surface of the rear cover 40, such that the ejection assembly 70 may be disposed in the first mounting portion 50. Therefore, when the ejection assembly 70 protrudes out of the first mounting portion 50, a first step 31 may be formed between the ejection assembly 70 and the screen assembly 30, and a second step 41 may be formed between the ejection assembly 70 and the back cover 40. The first step 31 and the second step 41 may affect the overall appearance of the electronic device 100, and impurities may easily enter and may be further collected in the first step 31 and the second step 41.

In order to avoid forming the first step 31 and the second step 41, the electronic device 100 may include the ejection assembly 70. Referring to FIG. 7, FIG. 8, FIG. 9A and FIG. 9B together, the ejection assembly 70 may include at least one driving mechanism 71, a first decorative member 72, a second decorative member 73, and at least one lifting mechanism 74. In this case, the first decorative member 72 and the second decorative member 73 may be opposite to each other and spaced apart from each other. Besides, the first decorative member 72 and the second decorative member 73 may be movable toward each other or away from each other.

Figure 10A:
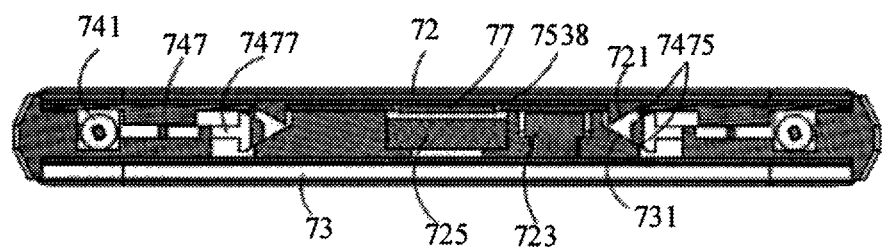
FIG. 10A is a sectional view of the electronic device shown in FIG. 4A according to some embodiments of the present embodiment; wherein the electronic device is in a second state.
Figure 10B:
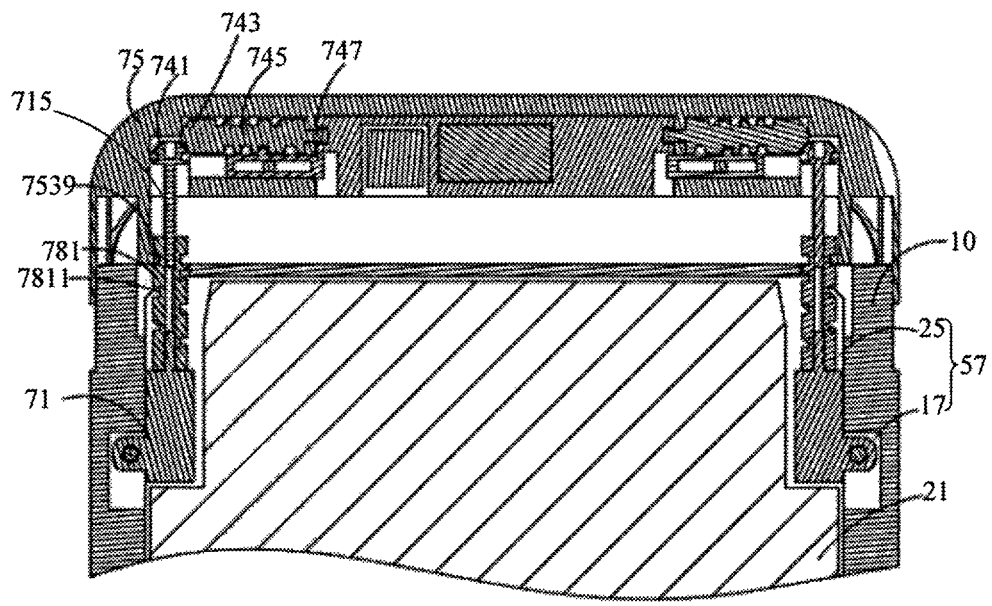
FIG. 10B is a sectional view of the electronic device shown in FIG. 4B according to some embodiments of the present embodiment; wherein the electronic device is in the second state.

Referring to FIG. 10A and FIG. 10B together, the at least one driving mechanism 71 may be disposed in the corresponding reserved space 57, and may be further fixed to the middle frame 10. Each driving mechanism 71 may be coupled to the corresponding lifting mechanism 74. The at least one lifting mechanism 74 may be disposed between the first decorative member 72 and the second decorative member 73. When the ejection assembly 70 protrudes out of the first mounting portion 50, the at least one lifting mechanism 74 may drive the first decorative member 72 and the second decorative member 73 to move away from each other, such that the first decorative member 72 may be substantially flush with an outer surface of the screen assembly 30, and the second decorative member 73 may be substantially flush with an outer surface of the back cover 40. In this way, the first step 31 and the second step 41 may be eliminated and disappeared. In this embodiment, two driving mechanisms 71 and two lifting mechanisms 74 may be provided.

Figure 9A:
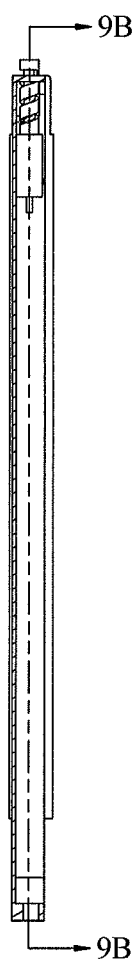
FIG. 9A is a side view of the middle frame and the driving mechanism of the electronic device shown in FIG. 8.
Figure 9B:
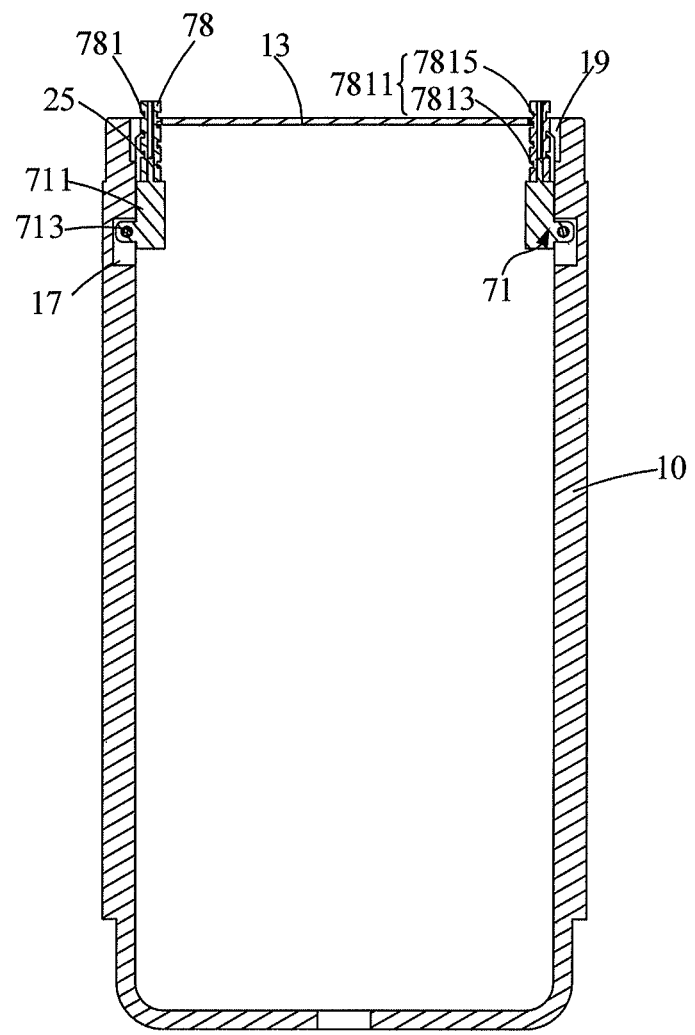
FIG. 9B is a sectional view of the middle frame and the driving mechanism of the electronic device shown in FIG. 9A taken along line 9B-9B.

More specifically, as shown in FIG. 9B, each driving mechanism 71 may include a driving member 711, a fixing member 713, and a transmission shaft 715. Each driving member 711 may be arranged in the corresponding second reserved portion 25. Each fixing members 713 may be arranged in the corresponding first reserved portion 17. Each driving member 711 may be fixed to the middle frame 10 via the corresponding fixing member 713. One end of the transmission shaft 715 may be adjacent to an output shaft of the driving member 711 in the first direction 200. The transmission shaft 715 may pass through the first end 13 of the middle frame 10 and further extend out of the middle frame 10. More specifically, the first end 13 of the middle frame 10 may define at least one through hole 19. The at least one through hole 19 may be defined corresponding to the transmission shaft 715 of the at least one driving mechanism 71. The other end of the transmission shaft 715 may extend through the corresponding through hole 19 and further extend out of the middle frame 10. More specifically, in some embodiments, the driving member 711 may be an electric motor. However, in other embodiments, it can be understood that, the driving member 711 may also be a hydraulic motor or the like. The types of the driving member 711 may be set as required.

Figure 7:
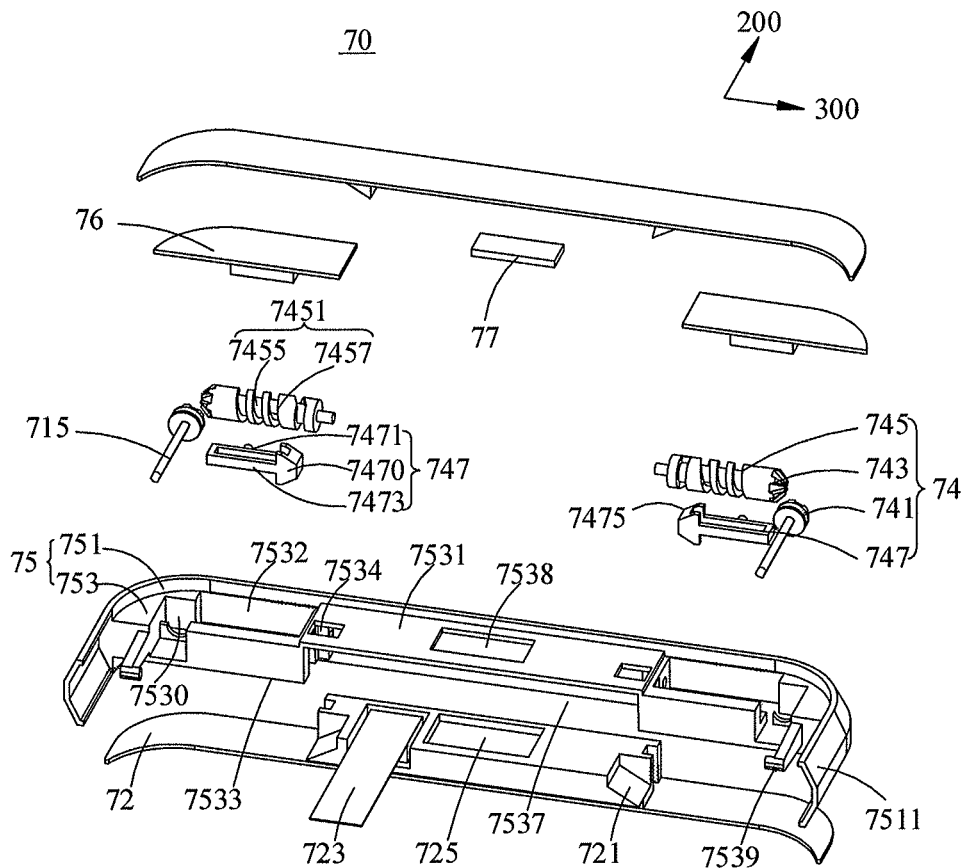
FIG. 7 is an exploded view of an ejection assembly of the electronic device shown in FIG. 2 along another direction; wherein a driving mechanism has been removed.
Figure 8:
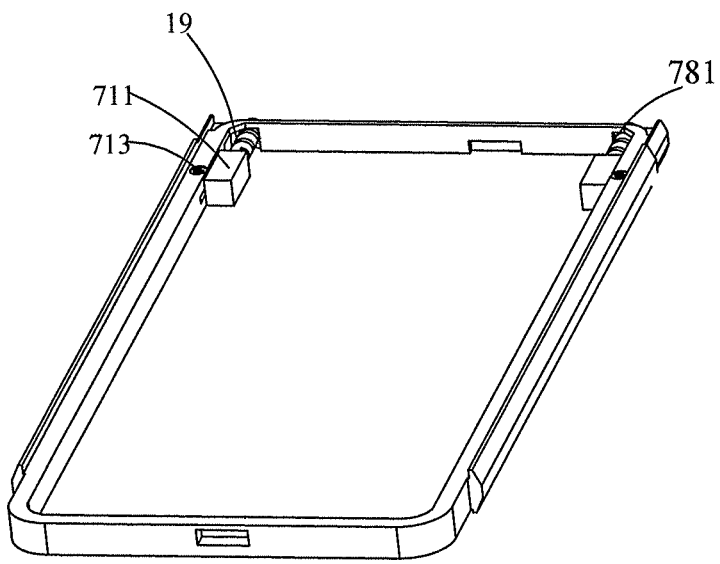
FIG. 8 is a schematic structural view of a middle frame and the driving mechanism of the electronic device shown in FIG. 2 along another direction.

Further, as shown in FIG. 7, each lifting mechanism 74 may include a first bevel gear 741, a second bevel gear 743, a first lead screw 745, and a push rod 747. The push rod 747 may be in shape of a wedge. In some embodiments, the first bevel gear 741 may be disposed along the first direction 200, that is, an axis of the first bevel gear 741 may be substantially parallel to the first direction 200. The first bevel gear 741 may be coupled to one driving mechanism 71. More specifically, the first bevel gear 741 may be coupled to one end of the transmission shaft 715 of the driving mechanism 71 that extends out of the middle frame 10. The second bevel gear 743 may be disposed along the second direction 300, that is, an axis of the second bevel gear 743 may be substantially parallel to the second direction 300. The second bevel gear 743 may be engaged with the first bevel gear 741, such that a 90-degree turn may be achieved. The first lead screw 745 may be disposed coaxially with the second bevel gear 743. More specifically, the second bevel gear 743 may be disposed at one end of the first lead screw 745 and further integrated with the first lead screw 745. Of course, in other embodiments, the second bevel gear 743 and the first lead screw 745 may also be two independent and separated components, that is, the second bevel gear 743 and the first lead screw 745 may be two components manufactured separately, and the second bevel gear 743 may be further sleeved on the first lead screw 745.

Referring to FIG. 7 further, the first lead screw 745 may define a first groove 7451, and the first groove 7451 may be in shape of a spiral. The push rod 747 may be adjacent to the first lead screw 745 and disposed along the second direction 300 (that is, an extending direction of the push rod 747 may be parallel to the second direction 300). One end of the push rod 747 may be inserted in the first groove 7451, the other end of the push rod 747 may cooperate with the first decorative member 72 and the second decorative member 73, and push the first decorative member 72 and the second decorative member 73 to move away from each other.

Figure 11A:
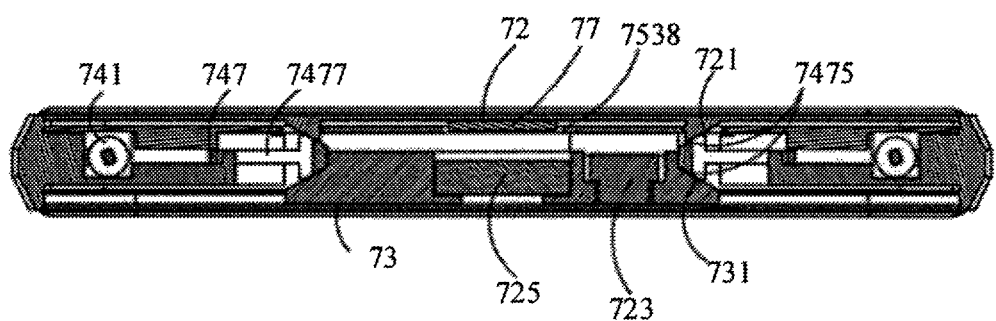
FIG. 11A is a sectional view of the electronic device shown in FIG. 4A according to some embodiments of the present embodiment; wherein the electronic device is in a third state.
Figure 11B:
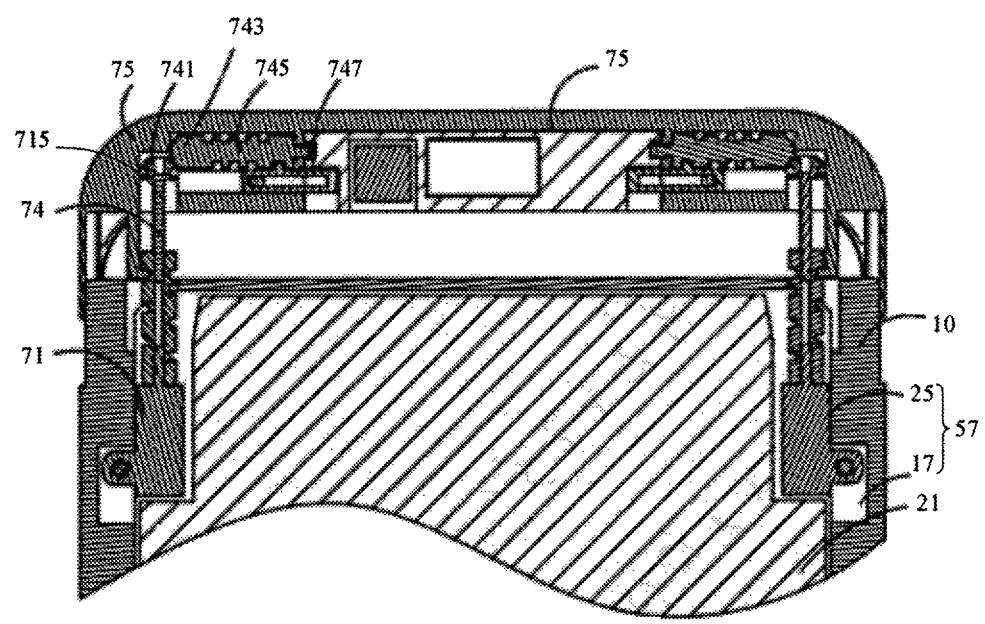
FIG. 11B is a sectional view of the electronic device shown in FIG. 4B according to some embodiments of the present embodiment; wherein the electronic device is in the third state.

More specifically, the push rod 747 may include a rod body 7470, a first inserting portion 7471 arranged at a side wall of the rod body 7470 that faces towards the first lead screw 745, and a pushing portion 7473 arranged at one end of the rod body 7470. The pushing portion 7473 may be in shape of a wedge. The inserting portion 7471 may be inserted into the first groove 7451. The pushing portion 7473 may cooperate with the first decorative member 72 and the second decorative member 7. More specifically, when the pushing portion 7473 is driven to move towards the first decorative member 72 and the second decorative member 73, the pushing portion 7473 may firstly contact with the second decorative member 73 (as shown in FIGS. 10A and 10B; at this time, the electronic device is in a second state), thereby pushing the second decorative member 73 to move away from the first decorative member 72. After that, the pushing portion 7473 may further contact with both the second decorative member 73 and the first decorative member 72 (as shown in FIGS. 11A and 11B; at this time, the electronic device is in a third state), thereby pushing the second decorative member 73 and the first decorative member 72 to move away from each other simultaneously, that is, both the second decorative member 73 and the first decorative member 72 will move at this time. In some embodiments, during the movement of the first decorative member 72 and the second decorative member 73, the position of screen assembly 30 and that of the back cover 40 may remain/keep unchanged.

More specifically, the pushing portion 7473 may include a pair of first inclined surfaces 7475 arranged symmetrically about a central axis of the pushing portion 7473. The first decorative member 72 may include a second inclined surface 721, and the second decorative member 73 may include a third inclined surface 731. The second inclined surface 721 may cooperate with one of the pair of first inclined surfaces 7475, while the third inclined surface 731 may cooperate with the other of the pair of first inclined surfaces 7475. When the push rod 747 is driven to move such that the pair of first inclined surfaces 7475 of the pushing portion 7473 respectively move toward the second inclined surface 721 and the third inclined surface 731, one of the pair of first inclined surfaces 7475 of the pushing portion 7473 may firstly get into contact with the third inclined surface 731 of the decorative member 73 (as shown in FIGS. 10A and 10B), thereby pushing the second decorative member 73 to move away from the first decorative member 72. The other of the pair of first inclined surfaces 7475 of the pushing portion 7473 may also gradually get close to the second inclined surface 721 of the first decorative member 72, and further get into contact with the second inclined surface 721 of the first decorative member 72 (as shown in FIGS. 11A and 11B). At this time, the pair of inclined surfaces 7475 of the first pushing portion 7473 may abut against both the second inclined surface 721 of the first decorative member 72 and the third inclined surface 731 of the second decorative member 73, thereby pushing the first decorative member 72 and the second decorative member 73 to move away from each other, and thus the first step 31 and the second step 41 may be eliminated correspondingly.

In some embodiments, as shown in FIG. 7, the ejection assembly 70 may further include a bracket 75. The bracket 75 may include an outer frame 751 and a supporting body 753. The outer frame 751 may extend around a periphery of the supporting body 753, and further protrude beyond the supporting body 753 in a direction perpendicular to the plane in which the first direction 200 and the second direction 300 are located. The lifting mechanism 74 may be disposed on the supporting body 753. The first decorative member 72 and the second decorative member 73 may be respectively located at two opposite sides of the supporting body 753. The first decorative member 72 and the second decorative member 73 may respectively match with the two opposite sides of the outer frame 751.

More specifically, the supporting body 753 may have a first surface 7531 and a second surface 7533 opposite to the first surface 7531. The first surface 7531 may face towards the second decorative member 73, while the second surface 7533 may face towards the first decorative member 72. A first receiving portion 7530, a second receiving portion 7532, and a third receiving portion 7534 may be sequentially arranged on the first surface 7531 of the supporting body 753 and correspond to each lifting mechanism 74. Each first bevel gear 741 may be disposed in the first receiving portion 7530. Each second bevel gear 743 and each first lead screw 745 may be disposed at one side of the second receiving portion 7532. A portion of each push rod 747 may be disposed at the other side of the second receiving portion 7532, and the other portion of each push rod 747 may be disposed in the corresponding third receiving portion 7534. Each push rod 747 may extend out of the corresponding third receiving portion 7534 and further cooperate with the first decorative member 72 and the second decorative member 73. In some embodiments, the first receiving portion 7530, the second receiving portion 7532, and the third receiving portion 7534 may be configured to be a structure defining a receiving groove.

In some embodiments, the first receiving portion 7530 may extend along the first direction 200 (that is, an axis of the first receiving portion 7530 may be substantially parallel to the first axis direction 200). The second receiving portion 7532 may communicate with the first receiving portion 7530, and extend along the second direction 300 (that is, an axis of the second receiving portion 7532 may be substantially parallel to the second direction 300). The third receiving portion 7534 may be disposed at one side of the second receiving portion 7532 that is away from the first receiving portion 7530, and further communicate with the second receiving portion 7532. The third receiving portion 7534 may extend through two opposite side faces of the supporting body 753.

More specifically, the rod body 7470 and the first inserting portion 7471 of each push rod 747 may be disposed at the other side of the second receiving portion 7532, and the pushing portion 7473 of each push rod 747 may be disposed in the third receiving portion 7534. The pair of first inclined surfaces 7475 of the pushing portion 7743 may protrude out from an opening of the third receiving portion 7534, and respectively match and cooperate with the second inclined surface 721 of the first decorative member 72 and the third inclined surface 731 of the second decorative member 73.

In some embodiments, referring to FIG. 4A and FIG. 4B, the supporting body may further include a guiding block 7535, and the guiding block 7535 may be disposed on a bottom wall of the second receiving portion 7532. Each push rod 747 may define a guiding groove 7477 in the second direction 300. Each guiding block 7535 may be inserted into the corresponding guiding groove 7477. When each push rod 747 is driven by the first lead screw 745 to slide along the second direction 300, the guiding block 7535 may provide a guide to the movement of the push rod 747.

In some embodiments, the first surface 7531 of the supporting body 753 may further define a mounting hole 7436. A mounting post 7453 may be disposed at one end of the first lead screw 745 that is away from the second bevel gear 743. The first lead screw 745 may be mounted in the mounting hole 7436 via the mounting post 7543.

In some embodiments, referring to FIG. 7 together, the ejection assembly 70 may further include at least one protective cover 76. The protective cover 76 may be disposed on the first surface 7531 of the supporting body 753, cover the first receiving portion 7530 and the second receiving portion 7532, and be located between the supporting body 753 and the second decorative member 73. In this embodiment, two protective covers 76 may be provided.

In some embodiments, the second surface 7533 of the supporting body 753 may be provided with a fourth receiving portion 7537. The at least one functional device (such as the camera 723 and the receiver 725) may be disposed at one side of the first decorative member 72 that is close to the supporting body 753. When the first decorative member 72 is disposed on the supporting body 753, the camera 723 and the receiver 725 may be disposed in the fourth receiving portion 7537.

In some embodiments, a first magnetic member (not shown) may be disposed in the receiver 725. The ejection assembly 70 may also include a second magnetic member 77. The second magnetic member 77 may be disposed on the second decorative member 73. A reserved portion 7538 may be arranged on the supporting body 753 at a position corresponding to the second magnetic member 77. When the first decorative member 72 and the second decorative member 73 are driven to move away from each other and the push rod 747 does not push against the first decorative member 72 and the second decorative member 73, the first magnetic member and the second magnetic member 77 may attract each other, such that the first decorative member 72 and the second decorative member 73 may move toward each other, and thus the first decorative member 72 and the second decorative member 73 may be reset.

In some embodiments, referring to FIG. 8, FIG. 9A, FIG. 9B, FIG. 10A and FIG. 10B together, the ejection assembly 70 may further include an ejecting mechanism 78. The ejecting mechanism 78 may include at least one second lead screw 781. Each second lead screw 781 may be disposed between the corresponding driving mechanism 71 and the first bevel gear 741. The first bevel gear 741 may be disposed at the end of the second lead screw 781 (that is, one end of the second lead screw 781 that is away from the driving member 711 of the driving mechanism 71). Each second lead screw 781 may also, define a second groove 7811, and the second groove 7811 may also be in shape of a spiral. The supporting body 753 may further include a second inserting portion 7539, and the second inserting portion 7539 may be disposed corresponding to each second lead screw 781. In some embodiments, the second inserting portion 7539 may be in shape of an L, and each second inserting portion 7539 may be inserted into the corresponding second groove 7811. In this case, two second lead screws 781 may be provided.

More specifically, referring to FIG. 7, FIG. 9A and FIG. 9B together, the first groove 7451 may include a slow-moving section 7455 and a first fast-moving section 7457. The second groove 7811 may include a second fast-moving section 7813 and an idle section 7815. The slow-moving section 7455 of the first groove 7451 may correspond to the second fast-moving section 7813 of the second groove 7811. The first fast-moving section 7457 of the first groove 7451 may correspond to the idle section 7815 of the second groove 7811. In this case, a pitch of the slow-moving section 7455 may be less than a pitch of the first fast-moving section 7457, and less than a pitch of the second fast-moving section 7813. Therefore, a moving speed of the push rod 747 in the slow forward section may be less than the moving speed of the push rod 747 in the first fast-moving section 7457, and also less than a moving speed of the second plug section 7539 in the second fast-moving section 7813.

Two free ends of the outer frame 751 may respectively protrude outwardly such that a guiding portion 7511 may be formed. Each guiding portion 7511 may be disposed adjacent to one second plug 7539. Each guiding portion 7511 may be inserted into one side of the first end 13 of the middle frame 10, and thus a smooth outer surface may be formed by the guiding portion 7511 and the middle frame 10.

Referring to FIG. 4A and FIG. 4B together, during the operation, when the electronic device is in the first state, the driving mechanism 71 may rotate in a first direction to drive the second lead screw 781 to rotate, and the second lead screw 781 may in turn drive the bracket 75, the lifting mechanism 74, the first decorative member 72, the second decorative member 73, the protective cover 76, and the second magnetic member 77 to move together away from the middle frame 10. At this time, the second inserting portion 7539 is located in the second fast-moving section 7813 of the second groove 7811 of the second lead screw 781, and the first inserting portion 7471 of the push rod 747 is located in the slow-moving section 7455 of the first groove 7451 of the first lead screw 745. In this way, other components of the ejection assembly 70 except the driving mechanism 71 may be ejected from the first mounting portion 50 of the electronic device 100. At this time, the push rod 747 is still at a distance from the corresponding second inclined surface 721 and the third inclined surface 731, and the push rod 747 will not push the first decorative member 72 and the second decorative member 73 to move away from each other.

Referring to FIGS. 10A, 10B, 11A and 11B, when the second inserting portion 7539 enters the idle section 7815 from the second fast-moving section 7813 of the second groove 7811 of the second lead screw 781, the first inserting portion 7471 of the push rod 747 may gradually enter the first fast-moving section 7457 from the slow-moving section 7455 of the first groove 7451 of the first lead screw 745. At this time, one of the pair of first surfaces 7475 of the push rod 747 may firstly get into contact with the corresponding third inclined surface 731 (as shown in FIGS. 10A and 10B, and the electronic device is in the second state at this time). The other of the pair of first inclined surfaces 7475 of the push rod 747 may be subsequently get into contact with the corresponding second inclined surface 721 (as shown in FIGS. 11A and 11B, and the electronic device is in the third state at this time). In this way, the push rod 747 may push the first decorative member 72 and the second decorative member 73 to move away from each other, such that the first decorative member 72 may be substantially flush with the outer surface of the screen assembly 30, and the second decorative member 73 may be substantially flush with the outer surface of the back cover 40. In this way, the first step 31 and the second step 41 may be eliminated and disappeared.

When the ejection assembly 70 needs to be received in the first mounting portion 50, the driving mechanism 71 may rotate in a reversed direction, and the moving processes of all the relative components are equivalent to the reverse processes of the above processes, and will not be described herein again. The difference lies in that, when the push rod 747 is driven to move away from the first decorative member 72 and the second decorative member 73, the first magnetic member and the second magnetic member 77 may attract each other, such that the first decorative member 72 and the second decorative member 73 may move toward each other, and thus the first decorative member 72 and the second decorative member 73 may be reset. At this time, when the second inserting portion 7539 enters the second fast-moving section 7813 from the idle section 7815 of the second groove 7811 of the second lead screw 781, the first inserting portion 7471 of the push rod 747 may gradually enter the slow-moving section 7455 from the first fast-moving section 7457 of the first groove 7451 of the first lead screw 745, and the driving mechanism 71 may drive other components of the ejection assembly 70 except the driving mechanism 71 to be gradually received in the first mounting portion 50.

In the above embodiment, the at least one functional device includes the camera 723 and the receiver 725. Of course, in other embodiments, the at least one functional device may further include at least one functional component selected from a group consisting of such as an iris recognition module, a face recognition module, a flash, a microphone, a photoreceptor, a fingerprint module, and a button.

In another aspect, an electronic device may be provided. The electronic device may include: a screen assembly 30, a back cover 40 opposite to the screen assembly 30, a middle frame 10 sandwiched between the screen assembly 30 and the back cover 40, and an ejection assembly 70. In this embodiments, a mounting portion 50 may be formed by the screen assembly 30, the middle frame 10, and the back cover 40. The ejection assembly 70 may be movably disposed in the mounting portion 50, such that the ejection assembly 70 is capable of extending out of the mounting portion 50 or retracting into the mounting portion 50. The ejection assembly 70 may include: a first decorative member 72, a second decorative member 73 opposite to and spaced apart from the first decorative member 72, at least one lifting mechanism 74, and at least one driving mechanism 71. The first decorative member 72 and the second decorative member 73 may be movable toward each other or away from each other. The at least one lifting mechanism 74 may be disposed between the first decorative member 72 and the second decorative member 73, and configured to drive the first decorative member 72 and the second decorative member 73 to move away from each other when the ejection assembly 70 extends out of the mounting portion 50, such that the first decorative member 72 may be substantially flush with the screen assembly 30, and the second decorative member 73 may be substantially flush with the back cover 40. The at least one driving mechanism 71 may be connected to each of the at least one lifting mechanism 74.

In the ejection assembly 70 and the electronic device 100 having the ejection assembly 70, after the ejection assembly 70 is ejected from the first mounting portion 50 of the electronic device 100, the lifting mechanism 74 may be driven by the driving mechanism 71 to push the first decorative member 72 and the second decorative member 73 to move away from each other, such that the first decorative member 72 may be substantially flush with the outer surface of the screen assembly 30, and the second decorative member 73 may be substantially flush with the outer surface of the back cover 40. In this way, it is possible to increase the screen ratio without affecting an overall appearance of the electronic device 100, and the sound quality and the user experience may be improved.

The above is a preferred embodiment of the present disclosure. It should be noted that, those skilled in the art can also make several improvements and modifications without departing from the principles of the present disclosure. All these shall be covered within the protection scope of the present disclosure.

What is claimed is:

1. An electronic device, comprising:
   a screen assembly,
   a back cover, opposite to the screen assembly,
   a middle frame, sandwiched and fixed between the screen assembly and the back cover; wherein a length of the middle frame in a first direction is less than a length of the screen assembly in the first direction, and less than a length of the back cover in the first direction, such that a mounting portion is formed by the screen assembly, the middle frame, and the back cover; and
   an ejection assembly, movably disposed in the mounting portion and comprising:
      at least one driving mechanism;
      a first decorative member;
      a second decorative member, opposite to and spaced apart from the first decorative member, wherein both the first decorative member and the second decorative member are movable, and the first decorative member and the second decorative member are capable of moving toward each other or away from each other; and
      at least one lifting mechanism, disposed between the first decorative member and the second decorative member; wherein each of the at least one lifting mechanism is connected to the corresponding driving mechanism; driven by the at least one driving mechanism, the at least one lifting mechanism is capable of driving both the first decorative member and the second decorative member to move, such that the first decorative member and the second decorative member move away from each other, such that the first decorative member is substantially flush with the screen assembly, and the second decorative member is substantially flush with the back cover.

2. The electronic device of claim 1, wherein each of the at least one lifting mechanism comprises:
   a first bevel gear, coupled to one of the at least one driving mechanism and having an axis substantially parallel to the first direction;
   a second bevel gear, engaged with the first bevel gear and having an axis substantially parallel to a second direction; wherein the second direction is perpendicular to the first direction;
   a first lead screw, disposed coaxially with the second bevel gear, and defining a first groove; and
   a push rod, adjacent to the first lead screw and extending in a direction substantially parallel to the second direction; wherein one end of the push rod is inserted in the first groove, and the other end of the push rod cooperates with the first decorative member and the second decorative member, such that the push rod pushes the first decorative member and the second decorative member to move away from each other.

3. The electronic device of claim 2, wherein the push rod comprises:
a rod body,
a first inserting portion, disposed at a side wall of the rod body that faces towards the first lead screw and inserted into the first groove; and
a pushing portion, disposed at one end of the rod body and cooperating with the first decorative member and the second decorative member to push the first decorative member and the second decorative member to move away from each other.

4. The electronic device of claim 3, wherein the pushing portion comprises a pair of first inclined surfaces opposite to each other; the first decorative member comprises a second inclined surface, and the second decorative member comprises a third inclined surface; the second inclined surface cooperates with one of the pair of first inclined surfaces, while the third inclined surface cooperates with the other of the pair of first inclined surfaces.

5. The electronic device of claim 2, wherein each of the at least one driving mechanism comprises a driving member, a fixing member, and a transmission shaft; wherein the driving member is disposed on the middle frame via the fixing member, and the transmission shaft is adjacent to an output shaft of the driving member along the first direction; the transmission shaft passes through the middle frame and is further connected to the first bevel gear.

6. The electronic device of claim 2, wherein the ejection assembly further comprises a bracket, and the bracket comprises an outer frame and a supporting body; the outer frame extends around a periphery of the supporting body, and the lifting mechanism is disposed on the supporting body;
wherein a mounting post is disposed at one end of the first lead screw that is away from the second bevel gear, and the supporting body defines a mounting hole; the first lead screw is mounted in the mounting hole via the mounting post.

7. The electronic device of claim 6, wherein the supporting body has a first surface and a second surface opposite to the first surface; a first receiving portion, a second receiving portion, and a third receiving portion are sequentially arranged on the first surface of the supporting body and correspond to each of the at least one lifting mechanism;
the first receiving portion extends along the first direction; the second receiving portion is communicated with the first receiving portion, and extends along the second direction; the third receiving portion is disposed at one side of the second receiving portion that is away from the first receiving portion, communicated with the second receiving portion, and extends through two opposite side faces of the supporting body;
the first bevel gear is disposed in the first receiving portion, and the second bevel gear and the first lead screw are disposed at one side of the second receiving portion; a portion of the push rod is disposed at the other side of the second receiving portion, and the other portion of the push rod is disposed in the third receiving portion; the push rod extends out of the third receiving portion, and cooperates with the first decorative member and the second decorative member.

8. The electronic device of claim 7, wherein the supporting body further comprises a guiding block, and the guiding block is disposed on the second receiving portion; the push rod defines a guiding groove in the second direction, and the guiding block is inserted into the guiding groove.

9. The electronic device of claim 7, wherein the ejection assembly further comprises a protective cover; the protective cover is disposed on the first surface, located between the supporting body and the second decorative member, and covers the first receiving portion and the second receiving portion.

10. The electronic device of claim 6, wherein the supporting body has a first surface and a second surface opposite to the first surface; a fourth receiving portion is arranged on the second surface of the supporting body; at least one functional device is disposed at one side of the first decorative member that is close to the supporting body; when the first decorative member is disposed on the supporting body, the at least one functional device is disposed in the fourth receiving portion.

11. The electronic device of claim 10, wherein one of the at least one functional device is provided with a first magnetic member, and the ejection assembly further comprises a second magnetic member; the second magnetic member is disposed on the second decorative member; a reserved portion is arranged on the supporting body at a position corresponding to the second magnetic member;
when the first decorative member and the second decorative member are driven to move away from each other and the push rod does not push against the first decorative member and the second decorative member, the first magnetic member and the second magnetic member attract each other, such that the first decorative member and the second decorative member move toward each other, and the first decorative member and the second decorative member are reset.

12. The electronic device of claim 3, wherein the ejection assembly further comprises:
an ejecting mechanism, comprising at least one second lead screw; wherein each of the at least one second lead screw is disposed between the driving mechanism and the first bevel gear; each of the at least one second lead screw rod defines a second groove; and
a second inserting portion, disposed corresponding to the at least one second lead screw and inserted into the second groove.

13. The electronic device of claim 12, wherein the first groove comprises a slow-moving section and a first fast-moving section, and the second groove comprises a second fast-moving section and an idle section;
when the first inserting portion is located in the slow-moving section, the second inserting portion is located in the second fast-moving section; when the first inserting portion is located in the first fast-moving section, the second inserting portion is located in the idle section.

14. The electronic device of claim 12, wherein the ejection assembly further comprises a bracket, and the bracket comprises an outer frame and a supporting body; the outer frame extends around a periphery of the supporting body;
each free end of the outer frame protrudes outwardly to form a guiding portion, and the guiding portion is disposed adjacent to the second inserting portion; the guiding portion is inserted into one side of the middle frame, such that a smooth outer surface is formed by the guiding portion and the middle frame.

15. An electronic device, comprising:
a screen assembly,
a back cover, opposite to the screen assembly,
a middle frame, sandwiched and fixed between the screen assembly and the back cover; wherein the middle frame comprises a pair of spaced and parallel external walls engaged with the screen assembly and the back cover; each of the external walls has a top lower than tops of the screen assembly and the back cover, and a mounting portion is defined by the tops of the screen assembly, the external walls, and the back cover;
an ejection assembly, movably disposed in the mounting portion, and having a first position at which the ejection assembly partially extends out of the mounting portion and a second position at which the ejection assembly is received in the mounting portion; wherein the ejection assembly comprises:
a first decorative member;
a second decorative member, opposite to and spaced apart from the first decorative member, wherein both the first decorative member and the second decorative member are movable, and the first decorative member and the second decorative member are capable of moving toward each other or away from each other;
at least one lifting mechanism, disposed between the first decorative member and the second decorative member, and configured to drive both the first decorative member and the second decorative member to move, such that the first decorative member and the second decorative member move away from each other when the ejection assembly is at the first position, such that the first decorative member is substantially flush with the screen assembly, and the second decorative member is substantially flush with the back cover; and
at least one driving mechanism, connected to each of the at least one lifting mechanism; and
at least one functional device, mounted on the ejection assembly; when the ejection assembly is at the first position, the at least one functional device is exposed out of the screen assembly.

16. The electronic device of claim 15, wherein each of the at least one lifting mechanism comprises:
a first bevel gear, coupled to one of the at least one driving mechanism and having an axis substantially parallel to the first direction;
a second bevel gear, engaged with the first bevel gear and having an axis substantially parallel to a second direction; wherein the second direction is perpendicular to the first direction;
a first lead screw, disposed coaxially with the second bevel gear, and defining a first groove; and
a push rod, adjacent to the first lead screw and extending in a direction substantially parallel to the second direction; wherein one end of the push rod is inserted in the first groove, and the other end of the push rod cooperates with the first decorative member and the second decorative member, such that the push rod pushes the first decorative member and the second decorative member to move away from each other.

17. The electronic device of claim 16, wherein the push rod comprises:
a rod body,
a first inserting portion, disposed at a side wall of the rod body that faces towards the first lead screw and inserted into the first groove; and
a pushing portion, disposed at one end of the rod body and cooperating with the first decorative member and the second decorative member to push the first decorative member and the second decorative member to move away from each other;
wherein the pushing portion comprises a pair of first inclined surfaces opposite to each other;
the first decorative member comprises a second inclined surface, and the second decorative member comprises a third inclined surface; the second inclined surface cooperates with one of the pair of first inclined surfaces, while the third inclined surface cooperates with the other of the pair of first inclined surfaces.

18. The electronic device of claim 17, wherein the ejection assembly further comprises:
an ejecting mechanism, comprising at least one second lead screw; wherein each of the at least one second lead screw is disposed between the driving mechanism and the first bevel gear; each of the at least one second lead screw rod defines a second groove; and
a second inserting portion, disposed corresponding to the at least one second lead screw and inserted into the second groove.

19. The electronic device of claim 18, wherein the first groove comprises a slow-moving section and a first fast-moving section, and the second groove comprises a second fast-moving section and an idle section;
when the first inserting portion is located in the slow-moving section, the second inserting portion is located in the second fast-moving section; when the first inserting portion is located in the first fast-moving section, the second inserting portion is located in the idle section.

20. An ejection assembly for an electronic device, the electronic device comprising a back cover, a screen assembly covering the back cover, and a middle frame sandwiched and fixed between the screen assembly and the back cover; wherein a length of the middle frame in a first direction is less than a length of the screen assembly in the first direction, and less than a length of the back cover in the first direction, such that a mounting portion is formed by the screen assembly, the middle frame, and the back cover;
the ejection assembly being movably disposed in the mounting portion and having a first position at which the ejection assembly partially extends out of the mounting portion and a second position at which the ejection assembly is received in the mounting portion; the ejection assembly comprising:
at least one driving mechanism;
a first decorative member;
a second decorative member, opposite to and spaced apart from the first decorative member, wherein both the first decorative member and the second decorative member are movable, and the first decorative member and the second decorative member are capable of moving toward each other or away from each other; and
at least one lifting mechanism, disposed between the first decorative member and the second decorative member; wherein each of the at least one lifting mechanism is connected to the corresponding driving mechanism; driven by the at least one driving mechanism, the at least one lifting mechanism is capable of driving both the first decorative member and the second decorative member to move, such that the first decorative member and the second decorative member move away from each other when the ejection assembly is at the first position, such that the first decorative member is substantially flush with the screen assembly, and the second decorative member is substantially flush with the back cover.

\* \* \* \* \*

UNITED STATES PATENT AND TRADEMARK OFFICE
CERTIFICATE OF CORRECTION

PATENT NO. : 10,855,820 B2  
APPLICATION NO. : 16/561575  
DATED : December 1, 2020  
INVENTOR(S) : Yuanqing Zeng Page 1 of 1

It is certified that error appears in the above-identified patent and that said Letters Patent is hereby corrected as shown below:

On the Title Page

Item (71) Applicant should read:  
Dongguan, Guangdong (CN)

Item (73) Assignee should read:  
Dongguan, Guangdong (CN)

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*